No. 609,981. Patented Aug. 30, 1898.
E. E. WHIPPLE.
WHEELED SUPPORTING ATTACHMENT FOR HARROWS.
(Application filed Dec. 27, 1897.)
(No Model.) 2 Sheets—Sheet 1.
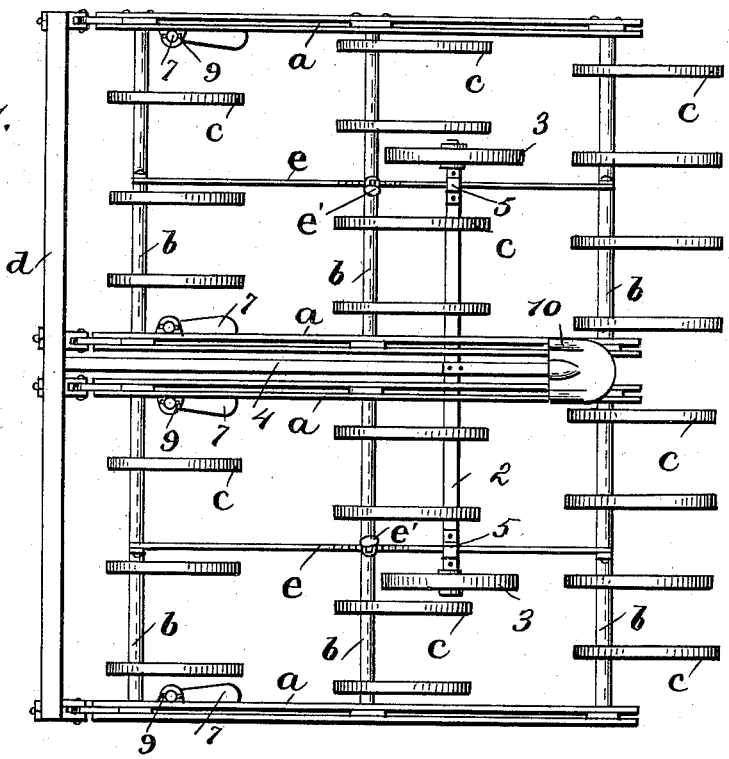
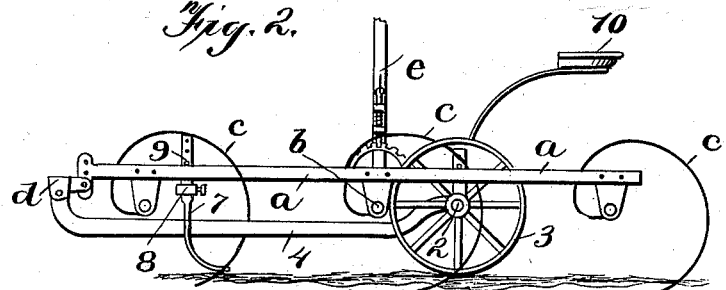
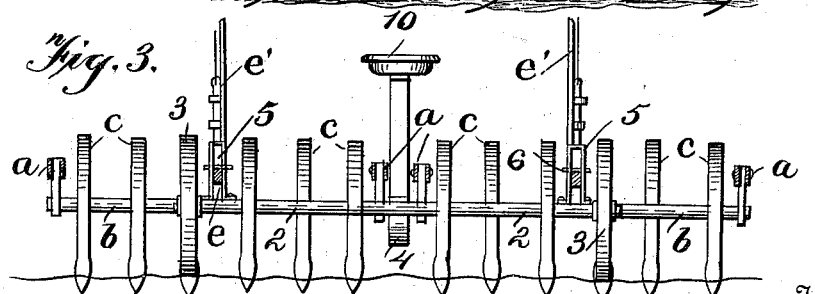
Witnesses
Geo. E. Frech.
Josephine C. Peck.
Inventor
E. E. Whipple
per Hubert E. Peck
Attorney
THE NORRIS PETERS CO., PHOTO-LITHO., WASHINGTON, D. C.

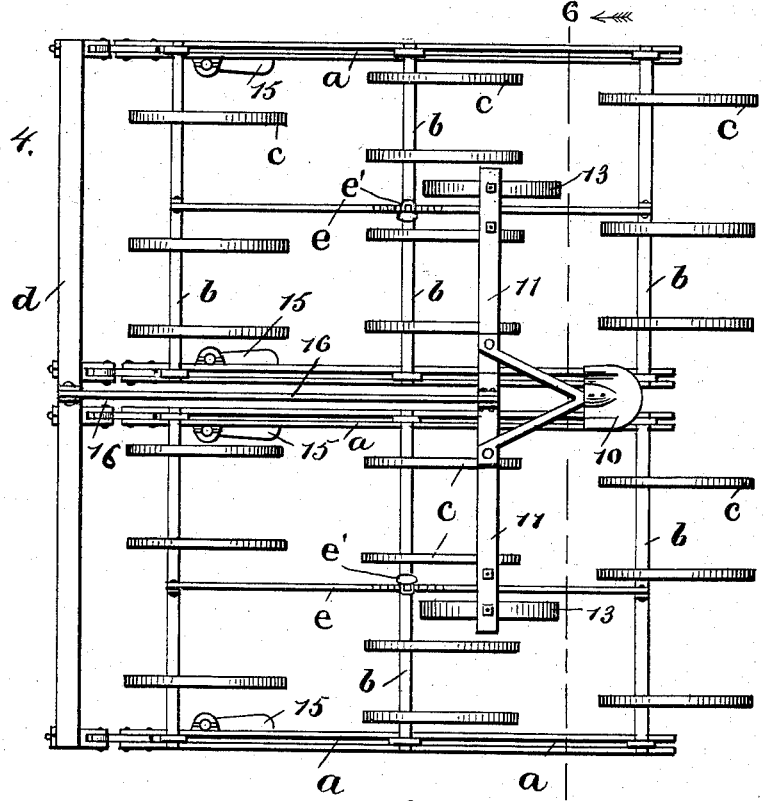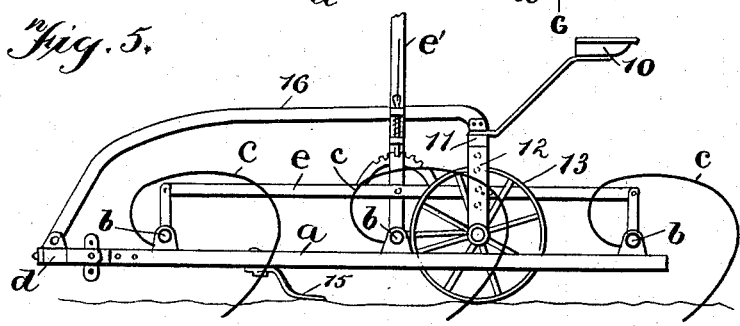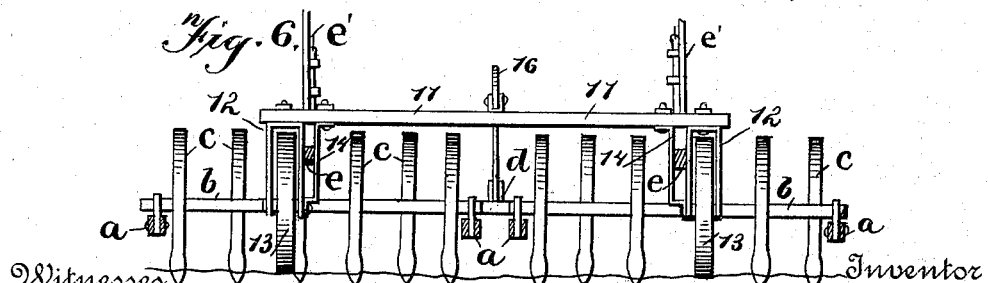

UNITED STATES PATENT OFFICE.

EFFINGER E. WHIPPLE, OF UTICA, NEW YORK.

WHEELED SUPPORTING ATTACHMENT FOR HARROWS.

SPECIFICATION forming part of Letters Patent No. 609,981, dated August 30, 1898.

Application filed December 27, 1897. Serial No. 663,683. (No model.)

*To all whom it may concern:*

Be it known that I, EFFINGER E. WHIPPLE, a citizen of the United States, residing at Utica, in the county of Oneida and State of New York, have invented certain new and useful Improvements in Wheeled Supporting Attachments for Harrows; and I do hereby declare the following to be a full, clear, and exact description of the invention, such as will enable others skilled in the art to which it appertains to make and use the same.

This invention relates to certain improvements in wheeled supporting attachments for harrows; and the objects and nature of the invention will more fully appear hereinafter.

The invention consists in certain novel features in construction and in combinations and in arrangements and in details, as more fully and particularly described and pointed out hereinafter.

Referring to the accompanying drawings, Figure 1 is a plan view of a two-section lever-adjustment harrow provided with one form of my improved wheeled supporting attachment. Fig. 2 is a side elevation thereof. Fig. 3 is a rear elevation. Fig. 4 is a top plan of another form of my wheeled supporting attachment applied to a two-section lever-adjustment harrow. Fig. 5 is a side elevation thereof having a different arrangement for coupling with the harrow and the draft thereof. Fig. 6 is a rear elevation.

In the drawings a two-section harrow is shown, although my invention is not limited in this respect to a particular harrow or form or construction thereof.

*a* are the side frame-bars of the harrow, having the turnable tooth-bars *b b* mounted in suitable journal-boxes carried thereby. *c* are the teeth secured to said tooth-bars, said teeth being usually of the curved-spring form. The harrow-sections are usually coupled at the front to an evener-bar *d*, arranged at the front ends of the sections.

Suitable means are provided for locking and turning the tooth-bars—such, for instance, as the adjusting-bars *e*. Each section usually has an adjusting-bar *e* extending along the center thereof above the tooth-bars and pivoted to arms rigid with and extending up from said tooth-bars.

An upright lever *e'* is rigid with one of the tooth-bars and pivotally joined to the adjusting-bar, and a rack and pawl are provided to lock the lever in the desired position to the adjusting bar. The operation of this well-known arrangement is obvious to those skilled in the art.

In employing my wheeled support I prefer to have the tooth-bar-adjusting levers *e'* mounted on the central or intermediate tooth-bars of the harrow-sections; but such arrangement is by no means essential to my invention.

Referring to the form of wheeled attachment shown in Figs. 1, 2, and 3, the reference-numeral 2 is an axle or supporting bar or frame arranged beneath the harrow-sections, preferably at an intermediate point thereof, usually a slight distance in the rear of the center thereof. This axle is provided with the supporting-wheels 3 3, mounted thereon and located, respectively, within the harrow-sections between the teeth and tooth-bars thereof and in no way interfering with the free operation and working of the teeth. This wheeled supporting-frame or axle 2 is usually of such length as to extend transversely of the harrow-sections across the space between the same and across the longitudinal center line of each section, but not beyond the outer sides of the sections, although the invention is not restricted to such length of the wheeled support. The wheeled support, however, preferably extends transversely beneath the inner frame-bars of the sections.

The wheeled support within the harrow-sections is suitably coupled with the draft of the harrow either directly or indirectly through some part of the harrow. However, I prefer, although my invention is not so restricted, to provide a draft-tongue 4, rigidly or otherwise secured to the wheeled supporting-frame or axle, usually at or about the center of the length thereof, and from thence extending forwardly and loosely coupled to the evener-bar, although the draft-tongue can be coupled at other parts of the harrow. This tongue is shown as extending downwardly and forwardly beneath the plane of the tooth-bars, and yet a sufficient distance above the ground and without interfering with the teeth. The tongue preferably extends forwardly in the space between the harrow-sections. The wheeled supporting-frame is arranged transversely beneath the tooth-adjusting bars above the tooth-bars and is provided with the upright guides or loops 5 5, embracing said adjusting-bars. Thus a rigid elongated U-shaped loop 5 can be bent from strap or bar metal, so as to loosely embrace an adjusting-bar, and its lower ends can be rigidly secured to the wheeled supporting-frame or axle, with the loop or guide extending vertically therefrom, permitting free vertical play of the adjusting-bar therein, but holding the same against lateral play independent of the guide and axle. The guide can be provided with a vertical series of transverse holes to receive a transverse stop or pin 6 and permit insertion of the same at various points above or below the adjusting-bar, for the purposes hereinafter appearing.

The harrow-sections are provided with suitable upholding or supporting devices for the front ends thereof, and such are preferably rendered vertically adjustable. For instance, I show shoes 7 confined to the frame-bars of each section a distance rearwardly from the front ends thereof. Each shoe is rendered vertically adjustable, for instance, by having its vertical shank passing loosely up through an aperture in the frame-bar and provided with a vertically-adjustable collar or sleeve 8 below the frame-bar and a series of holes and a pin 9 above the frame-bar or other suitable means whereby the shoe can be adjusted vertically with respect to the frame-bar and locked in the desired vertical adjustment.

It will be observed that when the adjustive levers are swung forward the teeth are elevated and the adjusting-bars move forwardly and downwardly in the guides carried by the wheeled support and are stopped against farther downward movement by engagement with the axle or supporting-frame or the pins extending through the guides and that the harrow-sections are thus upheld by or swung or suspended from the wheeled supporting-frame through the medium of the tooth-adjusting bars, which being located at the centers of the sections cause the same to be held against lateral tilting, which is also avoided by the shoes (if such be employed) slightly in advance of the transverse center of each section.

A great advantage of the arrangement shown is that the wheeled support is usually located as near the center of the length of the harrow-sections as possible, and hence when the teeth are elevated each section is balanced on the wheeled support, which almost entirely supports the same. The shoes merely prevent the sections tilting forward when elevated or carried on the support and also uphold the front ends of the sections if the entire weight thereof is not thrown onto and balanced on the wheeled support.

10 is a seat mounted on the wheeled supporting-frame by a suitable support, so that the occupant can easily reach and operate the adjusting-levers, preferably located on the intermediate tooth-bars, although they can be arranged on the rear tooth-bar.

When the teeth are lowered and the harrow is at work, the wheeled support can rise and fall independently of the harrow-sections by reason of the independent vertical movement between the upright guides and the adjusting-bars therein, and also the harrow-sections are allowed free vertical play; but the parts are held against independent lateral play, as the adjusting-bars are held between or within the guides.

By means of the adjustable pins or other stops the upward movement of the adjusting-bars in the guides can be variously limited or the adjusting-bars can be held down to the axle against independent movement. Also the pins can be located beneath the adjusting-bars to limit the downward movement of said bars, and consequently of the harrow-sections, whereby the working depth of the teeth can be varied and controlled. It should also be noted that these guides and adjustable stop devices can be dispensed with, if necessary or desirable, without departing from the spirit of my invention. With this improved attachment the working depth of the teeth can be controlled and the harrow can be held from the ground by the simple movement of elevating the teeth without employing other levers or operations and the harrow can be easily transported on the wheeled support with a minimum draft, and yet when in action the entire weight of the support and operator is not on the harrow, but the sections thereof are free to rise and fall. Also the invention might be arranged to suspend or balance the sections from other parts than through the medium of the adjusting-bars; but so far as I am at present advised I prefer such arrangement.

In Figs. 4, 5, and 6 I show a wheeled supporting-frame wherein an arched axle 11 is employed and arranged transversely above the harrow, just in rear of the transverse center thereof, and carrying a seat. At its ends this axle 11 has the depending frames 12, in which the supporting-wheels 13 are mounted so that the wheels are located within the harrow-sections, about as shown in Fig. 1. The axle also has depending double guides 14, in which the adjusting-bars can play vertically, with stops in the guides beneath said bars to limit the downward movement thereof and uphold the harrow-sections, as described in connection with Figs. 1 to 3.

The harrow-sections are usually provided with shoes 15 or other supports just in advance of the transverse center, preferably secured to the frame-bars so that the sections will be balanced as before described.

A tongue 16 is rigidly secured to the axle or supporting-frame and at the front is coupled to some part of the harrow.

The tongue 16 is shown rigidly attached to the central portion of the arched axle and extending above the plane of the harrow and at its front end coupled to the front evener-bar; but it is obvious that other arrangements can be employed to hold the axle and its seat against tilting and to move the same forward with the harrow and yet permit independent play of the harrow-sections. By balancing or upholding the harrow about at its transverse central portion, about as set forth, the wheeled attachment carries practically the entire weight of the harrow during transportation, so that the depending frame-supports barely touch the ground and prevent the harrow rocking or tilting laterally or fore and aft, whereby the harrow can be moved with a minimum draft and friction, and the working depth can be most easily controlled by varying the horizontal plane of the support or supports of the said wheeled attachment. These advantages do not exist where the wheeled attachment and support for the harrow are arranged in rear thereof and limit the downward movement of and uphold only the rear end of the harrow, depending on shoes or other depending frame-supports to hold up the front end of the frame.

In operating ordinary float-lever-adjustment curved-spring-tooth harrows it is necessary to raise the frame by hand to permit the lever to throw the teeth down, because the frame must elevate to enable the points of the teeth to lower. In riding-harrows of this class where the seat is carried by or mounted on the harrow-frame or where the riding attachment is connected to the harrow in other ways, although separate therefrom, the frame must be first lifted to permit the teeth to lower, and where the seat is carried by the frame the rider must leave the seat, and hence remove his weight from the harrow, every time the teeth are lowered. In working trashy ground it is necessay to raise the teeth very often to clear them of trash, &c., and every time this is done the team must be stopped and the rider must climb down from his seat to again force down the teeth and in most cases must take hold of the harrow-frame and hold it up as the teeth are forced down. All this is very objectionable and a very serious difficulty in the operation of lever-adjustment curved-spring-tooth harrows.

One object of my invention contemplates a wheeled riding attachment so combined with a lever-adjustment spring-tooth harrow as to overcome and avoid said before-mentioned objections common to such harrows as heretofore employed. For instance, in the constructions illustrated in the accompanying drawings it will be noted that the support carried by the riding attachment is arranged intermediate of the length of the harrow, although such arrangement may not be essential in this particular feature of my invention, and hence when the teeth are working their full depth as allowed by the adjustment the connecting-bar of the tooth-bar engages said support and limits further downward movement. When the hand-lever is swung forward to raise the teeth, the connecting-bar moves forwardly, and consequently not only holds the frame from dropping down as the teeth move up, but also raises said frame or draws it up toward the connecting-bar, which is held by said support against downward movement. This is facilitated by having the support beneath an intermediate portion of the connecting-bar. Hence when the hand-lever is swung back to lower the teeth the frame is held elevated, and also as the lever is drawn farther back beyond the perpendicular the connecting-bar will again begin to draw up the frame, thereby permitting the tooth-points to move down their full distance without a leverage thereon or rendering the points thereof fulcrums on the ground to elevate the frame, which is forcibly upheld or drawn up by the connecting-bar on the support carried by the riding attachment. By having the riding attachment arranged within the harrow-frame the tracks of the wheels are covered by teeth in rear of the same, and also the harrow can be easily turned in a limited area, and is compact and does not occupy so much space as where a trailing wheeled attachment is employed, and also a light and effective construction can be employed, which carries almost the entire harrow by balancing the same on the riding attachment.

It is evident that various changes might be made in the forms, constructions, and arrangements of the parts described without departing from the spirit and scope of my invention. Hence I do not wish to limit the invention to the constructions set forth, but consider myself entitled to all such changes as fall within the spirit and scope of my invention.

What I claim is—

1. A sectional harrow having the tooth-adjusting bars arranged about centrally of the sections thereof, a wheeled support within the harrow and across the sections thereof with guides between which said bars play having stops to limit the downward movement of the said bars.

2. A harrow having an independent wheeled riding and supporting attachment coupled loosely with the harrow and arranged within the frame of the harrow with supporting parts or portions beneath and limiting the downward movement of the harrow, whereby the weight of the harrow is carried by said attachment and the harrow is suspended from or balanced on said supporting parts.

3. A several-section lever-adjustment harrow having front depending supports, and provided with a wheeled riding attachment or support loosely coupled with the harrow and arranged transversely of the harrow-sections and intermediate of the length thereof and in advance of the rear ends of the sections, substantially as described.

4. A lever-adjustment several-section harrow having an independent wheeled riding attachment or support extending beneath intermediate portions of the adjusting-bars of the harrow-sections and arranged to uphold the sections through the medium of said bars.

5. A lever-adjustment several-section harrow having an independent wheeled riding attachment extending transversely of the sections and beneath parts thereof between the front and rear harrow-tooth bars, said attachment constructed and arranged to permit independent vertical play of the sections and to hold the same suspended or balanced from said intermediate parts and sustain practically the full weight of the sections, substantially as described.

6. A lever-adjustment curved-spring-tooth harrow comprising several independent sections, in combination with a wheeled riding attachment limiting the downward movement of said harrow-sections and permitting independent vertical movement of said sections above a fixed plane or planes, said attachment arranged intermediate of the length of the harrow-sections and extending transversely of the space between the two sections and of the inner frame-bars of the sections and having its wheels between the frame and tooth-bars and in advance of the rear tooth-bars, substantially as described.

7. A lever-adjustment curved-spring-tooth harrow comprising several independent sections, in combination with a wheeled riding and supporting attachment limiting the downward movement of the harrow-sections to uphold the frames thereof from the ground whether the teeth are in or out of operative adjustment, said attachment comprising an axle or frame arranged transversely of the sections in advance of the rear ends thereof and across the space between the sections with supporting-wheels between the frame and tooth-bars of the respective sections, and a draft appliance from said frame or axle extending forwardly to move the attachment forward with the harrow.

8. A lever-adjustment harrow comprising several independent sections, in combination with a wheeled riding and supporting attachment having an axle arranged transversely of the sections and across the inner sides thereof and in front of the rear portions of the sections and having supporting-wheels within intermediate parts of the sections, said attachment constructed and arranged to limit the downward movement of both sections and permit free upward play thereof above said limit, and provided with means coupling the attachment with the draft of the harrow and holding the axle against tilting, and depending ground-supports from the harrow-sections just in advance of the wheeled attachment, substantially as described.

9. A several-section harrow, in combination with an axle arranged above the sections and extending transversely of intermediate portions of both sections and provided with supporting-wheels between the frame and tooth-bars and teeth of the respective sections and a draft-tongue from the axle extending forwardly and coupled with the draft of the harrow, said axle provided with elongated guideways loosely receiving a part of each harrow-section and each having an adjustable stop, as and for the purposes set forth.

10. A several-section lever-adjustment curved-spring-tooth harrow, each section having the central connecting-bar and the hand-lever on an intermediate tooth-bar, in combination with a wheeled supporting and riding attachment arranged transversely of an intermediate part of the harrow with its supporting-wheels between the tooth and frame bars of the respective sections, said attachment having supports beneath the respective connecting-bars of the sections limiting the downward movement thereof below certain planes and arranged beneath intermediate parts of the lengths of the bars and thereby upholding or balancing the sections from said connecting-bars, said sections having depending frame-supports in advance of the wheeled attachment to hold the front ends of the section-frames from tilting forwardly onto the ground.

11. A two-section lever-adjustment curved-spring-tooth harrow, each section having the about-central connecting-bar, and depending frame-supports in advance of its central portion, in combination with an independent wheeled riding attachment arranged transversely of the sections at or about the central or an intermediate portion thereof, said attachment coupled with the draft of the harrow and provided with vertically-elongated supports receiving the connecting-bars of the sections, respectively, near the central or intermediate portions of the lengths thereof, and limiting the downward movement of each connecting-bar and thereby upholding the sections and balancing the same independently from and by the connecting-bar of each.

12. A lever-adjustment curved-spring-tooth harrow having the connecting-bar, in combination with an independent wheeled riding attachment provided with a support at an intermediate portion of said connecting-bar and arranged with relation to coacting with said connecting-bar to hold the same so that the harrow-frame is drawn up to permit the teeth being forced down without requiring the rider to leave his seat or lift the harrow-frame by hand, substantially as described.

13. A rocking-tooth-bar lever-adjustment curved-spring-tooth harrow, in combination with an independent wheeled riding attachment coupled to move with the harrow and permit independent play of the harrow, said attachment having a support constructed and arranged to coöperate with a part of the harrow about at the transverse central portion thereof, and lift the harrow-frame independently of the riding attachment and balance the harrow therefrom and carry practically its full weight, substantially as described.

14. A rocking-tooth-bar lever-adjustment curved-spring-tooth harrow, having the usual connecting-bar, the harrow-frame and connecting-bar approaching or receding from each other as the tooth-bars are rocked, in combination with an independent wheeled riding attachment moving with the harrow and provided with a stop or support at an intermediate part of the connecting-bar and limiting the downward movement thereof below a certain plane and thereby causing the harrow-frame to draw up toward said bar when the tooth-bars are rocked beyond certain points and hence elevating the harrow-frame and permitting the teeth to easily move down independently of the riding attachment and while the operator retains his seat, substantially as described.

15. A lever-adjustment curved-spring-tooth harrow having depending ground-supports in advance of its transverse central portion, in combination with an independent wheeled riding attachment moving forward with the harrow and arranged transversely intermediate of the harrow, and comprising supports about at the central portion of the harrow and upholding the same in an elevated plane and balancing and sustaining practically the weight thereof, said harrow allowed vertical play independent of the riding attachment and above the plane of said supports, substantially as described.

16. A harrow having an independent wheeled riding attachment arranged within the frame thereof and constructed and arranged to limit downward movement of said frame at intermediate points of the harrow and to thereby balance and uphold practically the entire harrow from the riding attachment, and means to hold the harrow-frame from rocking or tilting into engagement with the ground, substantially as described.

17. A rocking-tooth-bar lever-adjustment harrow having the connecting-bar, in combination with an independent wheeled supporting attachment moving forward with the harrow and provided with a support at a point over the harrow holding said bar against downward movement below a certain plane, whereby the frame draws up toward said bar when the tooth-bars are rocked beyond certain points, said support upholding practically the entire weight of the harrow through the medium of said bar and throwing said weight onto the wheeled attachment.

18. A harrow, in combination with an independent wheeled riding attachment moving forward therewith and provided with adjustable supports arranged about at the transverse central portion of the harrow and upholding the harrow in an elevated plane and governing the working depth of the teeth and balancing the harrow and throwing practically the entire weight of the harrow onto the attachment from intermediate points of the harrow, substantially as described.

19. A harrow having depending shoes between its transverse center and front end, in combination with a wheeled riding attachment arranged within the harrow just in rear of its transverse center line and provided with supports about at the central portion of the harrow constructed and arranged to limit the downward movement of the harrow whether the teeth are in or out of the soil and balancing and upholding the harrow from said intermediate points.

20. A lever-adjustment harrow having a connecting-bar, in combination with an independent wheeled support having an upright guide loosely receiving said connecting-bar and in which said bar moves vertically and provided with a stop limiting the downward movement of the bar and upholding the harrow through the medium of said bar.

In testimony whereof I affix my signature in presence of two witnesses.

EFFINGER E. WHIPPLE.

Witnesses:
M. MAUD WHIPPLE,
HANNAH M. WHIPPLE.